US009895965B2

(12) United States Patent
Mathai et al.

(10) Patent No.: US 9,895,965 B2
(45) Date of Patent: Feb. 20, 2018

(54) PASSIVELY CONTROLLED DUAL-STATE VACUUM SWITCHABLE MOUNT

(71) Applicant: Ford Global Technologies, LLC, Dearborn, MI (US)

(72) Inventors: Thomas Mathai, Farmington, MI (US); Hassan Dakhlallah, Dearborn, MI (US); Nagari Achar, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 87 days.

(21) Appl. No.: 14/924,517

(22) Filed: Oct. 27, 2015

(65) Prior Publication Data
US 2017/0113534 A1    Apr. 27, 2017

(51) Int. Cl.
| | | |
|---|---|---|
| *F16F 13/10* | (2006.01) | |
| *B60K 5/12* | (2006.01) | |
| *F16F 13/26* | (2006.01) | |
| *B60K 5/04* | (2006.01) | |

(52) U.S. Cl.
CPC .............. *B60K 5/1283* (2013.01); *B60K 5/04* (2013.01); *B60K 5/1208* (2013.01); *F16F 13/10* (2013.01); *F16F 13/105* (2013.01); *F16F 13/107* (2013.01); *F16F 13/262* (2013.01); *B60Y 2306/09* (2013.01)

(58) Field of Classification Search
CPC ........ F16F 13/10; F16F 13/105; F16F 13/107; F16F 13/262; B60K 5/1283; B60K 5/1208; B60K 5/04
See application file for complete search history.

(56) References Cited

U.S. PATENT DOCUMENTS

| | | |
|---|---|---|
| 4,588,173 A | 5/1986 | Gold et al. |
| 4,840,358 A | 6/1989 | Hoying et al. |
| 4,869,477 A | 9/1989 | Hoying et al. |
| 4,932,636 A | 6/1990 | Phillips et al. |
| 5,246,212 A * | 9/1993 | Funahashi ............... F16F 13/10 180/312 |
| 5,246,213 A | 9/1993 | Zup et al. |
| 6,036,183 A | 3/2000 | Lee et al. |
| 6,361,031 B1 | 3/2002 | Shores et al. |
| 6,422,545 B1 | 7/2002 | Baudendistel et al. |
| 7,475,872 B2 | 1/2009 | Kries et al. |
| 7,513,491 B2 | 4/2009 | Ogawa et al. |

(Continued)

FOREIGN PATENT DOCUMENTS

JP    2003049892 A    2/2003

Primary Examiner — Anna M Momper
(74) Attorney, Agent, or Firm — Julia Voutyras; McCoy Russell LLP

(57) ABSTRACT

Methods and systems are provided for a dual state hydromount in order to passively introduce air underneath a decoupler such that the stiffness of the air pocket adds to the stiffness of the decoupler, thereby increasing a level of damping available in a vehicle ride mode, the ride mode defined by vehicle speeds greater than a threshold speed. In one example, a dual state hydromount is described wherein a partitioning structure may be alternately coupled to either vacuum or atmosphere, and when coupled to atmosphere an air spring is created under the decoupler via the passive directing of air to the decoupler via a one way check valve. In this way, introduction of an air spring is achieved without additional active control.

6 Claims, 7 Drawing Sheets

(56) References Cited

U.S. PATENT DOCUMENTS

| | | |
|---|---|---|
| 8,439,335 B2 | 5/2013 | Kim et al. |
| 8,517,359 B2 * | 8/2013 | Graeve ................ F16F 13/108 |
| | | 267/140.13 |
| 2010/0096789 A1 * | 4/2010 | Gannon ............... B60K 5/1266 |
| | | 267/140.15 |
| 2012/0049424 A1 | 3/2012 | Bradshaw et al. |
| 2013/0292889 A1 | 11/2013 | Power |
| 2014/0014450 A1 | 1/2014 | West |
| 2014/0339748 A1 | 11/2014 | Mathai et al. |

* cited by examiner

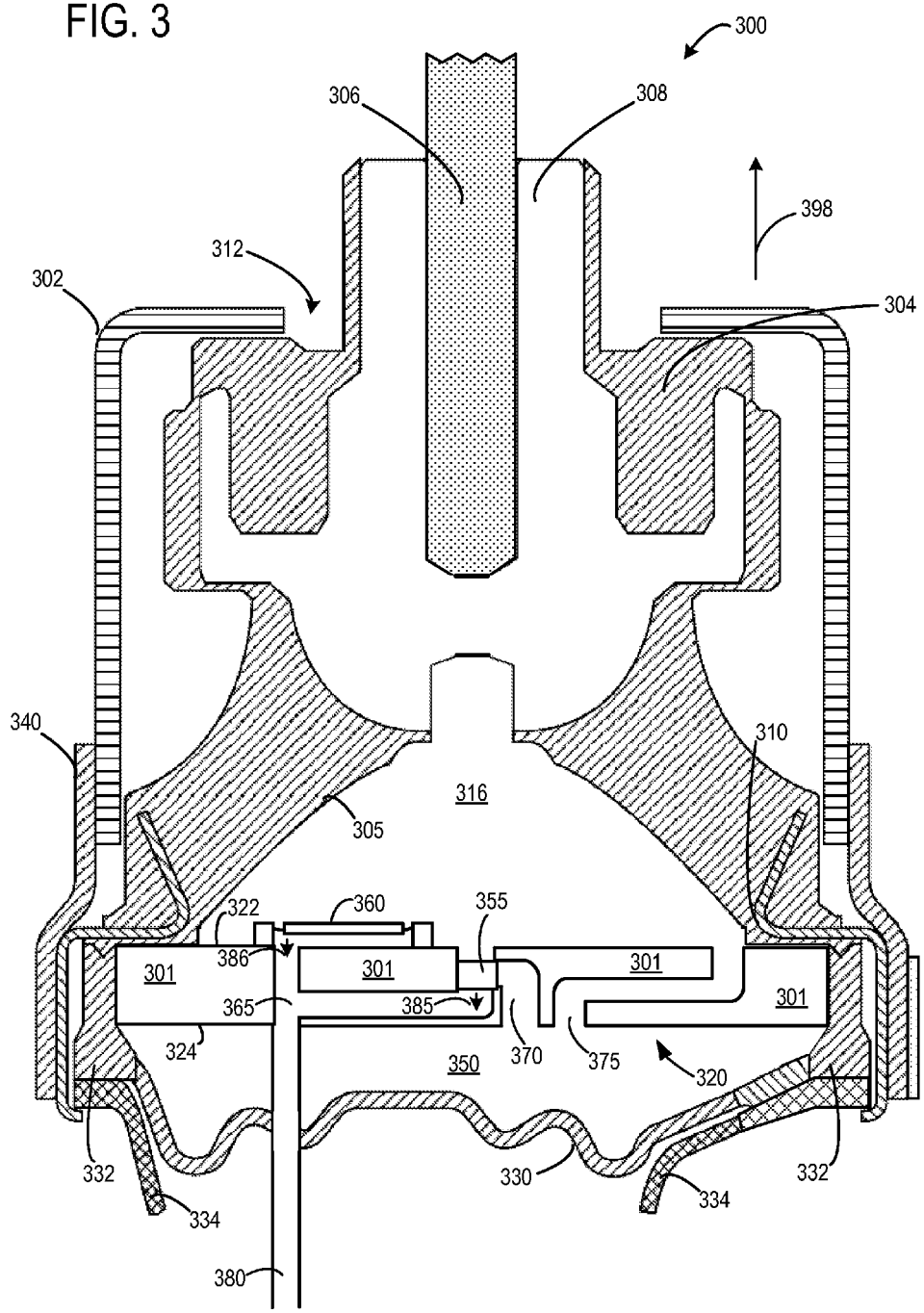

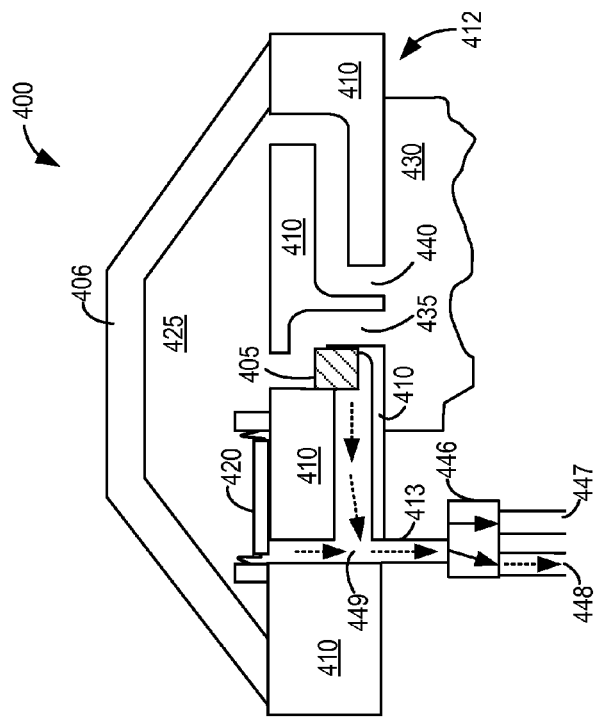

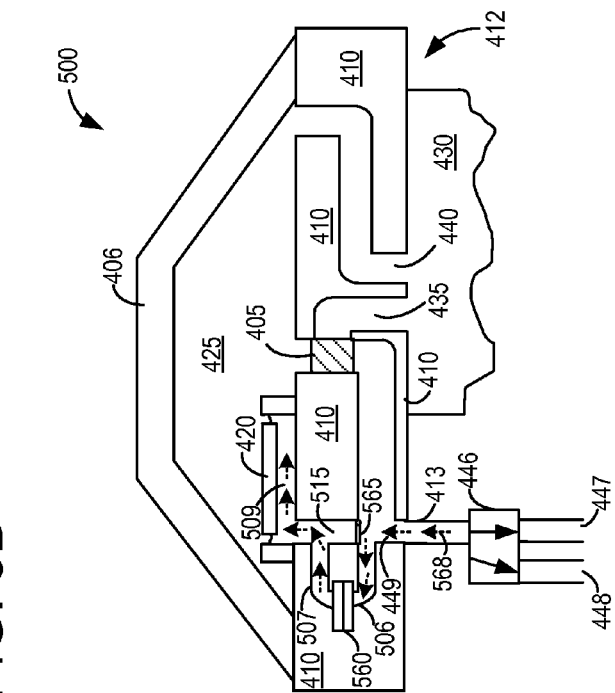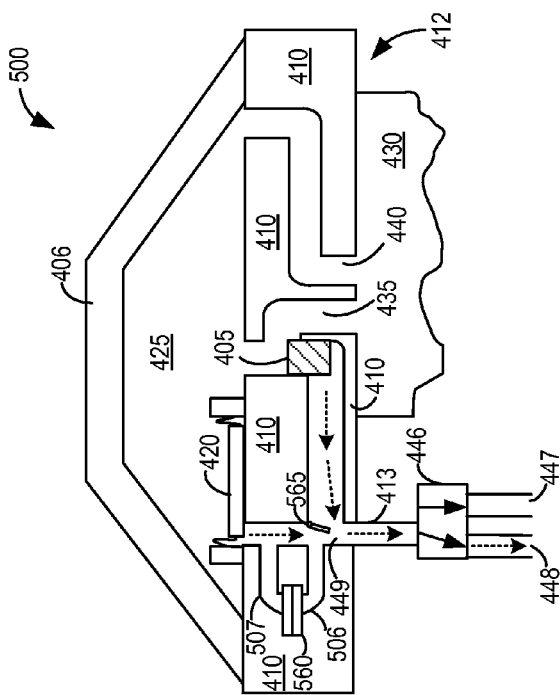

PASSIVELY CONTROLLED DUAL-STATE VACUUM SWITCHABLE MOUNT

FIELD

The present disclosure relates to an engine mount and methods for operation of an engine mount.

BACKGROUND/SUMMARY

Engine mounts may be used to attach engines to vehicle frames or other suitable structural vehicle elements. However, the engine and/or vehicle may generate vibrations during operation. Therefore, hydraulic dampening engine mounts have been developed to attenuate engine vibrations during vehicle operation. Hydraulic engine mounts may provide several configurations, enabling the dampening provided by the mount to be adapted for different operating conditions. For example, while driving on a smooth road at highway speeds the vehicle may shake and vibrate unless engine mounts having a high dynamic stiffness and damping are used to mount the engine on the frame. On the other hand, soft engine mounts having low dynamic stiffness are required to provide good isolation of the engine during engine idle conditions. As such, hydraulic engine mounts may have a first configuration for idle operation dampening and a second configuration for motive engine operation dampening.

A typical hydraulic mount includes a first fluid chamber (e.g., pumping chamber) enclosed by a first elastomeric member, wherein the first fluid chamber includes one or more fluid tracks (e.g., orifice tracks) opening to the chamber and extending to a second fluid chamber or reservoir that is typically bounded by a flexible second elastomeric member (e.g., diaphragm). The second fluid chamber is typically located on the opposite side of a partitioning structure from the pumping chamber. During compression, fluid is pressurized in the first fluid chamber and flows through the one or more fluid tracks to the reservoir. During rebound, fluid is drawn back to the first fluid chamber from the second fluid chamber. Mount dynamic stiffness and damping performance are thus determined, for example, by characteristics such as first fluid chamber geometry, chamber wall material, and the one or more fluid track properties.

Typical hydraulic mounts may further include an elastomer type decoupler that aids in isolating high frequency, low displacement vibrations. Modification of the properties of the decoupler may thus result in changing the level of damping provided by the engine mount. Toward this end, U.S. Pat. No. 6,361,031 B1 teaches a decoupling diaphragm, one side of which is exposed to the fluid in the first fluid chamber, and the other side of which is exposed to the pressure level in a control cavity. During normal operation, the control cavity is vented to atmosphere, and the mount functions as a typical hydraulic mount. However, a solenoid actuator may be actuated to trap air in the control cavity, which acts as an air spring thus resisting movement of the decoupling diaphragm. As such, resistance to deflection of the decoupling diaphragm is greater than that provided when the control cavity is communicated to atmosphere, but less than that provided when the decoupling diaphragm is seated against a surface. However, the inventors herein have recognized potential issues with such a method. For example, the use of a solenoid actuated valve increases the cost and complexity of the engine mount and requires the use of active control. Another approach taught by U.S. Pat. No. 6,361,031 B1 includes the use of a vacuum actuated valve in place of a solenoid actuated valve to trap air in the cavity. However, the use of a vacuum actuated valve suffers from the same issues, namely the requirement for active control over the trapping of air within the cavity to create an air spring.

Thus, the inventors have developed systems and methods to at least partially address the above issues. In one example, a method is provided comprising, in a first condition, evacuating (e.g., applying a second pressure) a vacuum chamber housed within a partitioning structure of a hydraulic engine mount such that a first fluid track (e.g., idle track) and a second fluid track (e.g., ride track) are opened in parallel and such that a decoupler element is maintained seated against the partitioning structure; and in a second condition, applying atmospheric pressure (e.g., applying a first pressure) to the vacuum chamber such that the first fluid track is closed, the second fluid track is maintained open, and air is passively trapped underneath the decoupler.

As one example, the application of the first pressure passively traps air under the decoupler by closing a vacuum-actuated valve (e.g., second vacuum actuated valve) and directing the flow of air through a first air passage to a second air passage via a one way check valve, the second air passage in fluid communication with the decoupler and the closed second vacuum-actuated valve, and wherein the first and second air passages and one way check valve housed within the partitioning structure. In this way, air may be passively introduced underneath the decoupler depending on engine operating conditions, the stiffness of the introduced air pocket or air spring adding to the stiffness of the decoupler, without the need for additional active control.

As one example, the first condition may comprise selectively applying the second pressure (e.g., vacuum) to the vacuum chamber under conditions wherein vehicle speeds are less than or equal to a predetermined speed, such a condition referred to as an idle mode, and wherein the second condition may comprise selectively applying the first pressure to the vacuum chamber under conditions wherein vehicle speeds are greater than a predetermined speed, such a condition referred to as an ride mode.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3 shows a cross-sectional view of the hydraulic mount shown in FIG. 1, including a partitioning structure and decoupler element.

FIG. 4A shows a simplified view of the hydraulic mount shown in FIG. 1 wherein application of a second pressure (e.g., vacuum) opens a first fluid track (e.g., idle track) and seats the decoupler against the partitioning structure.

FIG. 4B shows a simplified view of the hydraulic mount shown in FIG. 1 wherein application of a first pressure (e.g., atmospheric pressure) closes the first fluid track (e.g., idle track) and enables movement of the decoupler.

FIG. 5A shows a simplified view of a hydraulic mount with an additional second vacuum-actuated valve and a one-way check valve, wherein application of the second pressure (e.g., vacuum) opens a first fluid track (e.g., idle track) and seats the decoupler against the partitioning structure.

FIG. 5B shows a simplified view of a hydraulic mount with an additional second vacuum-actuated valve and a one-way check valve wherein application of the first pressure (e.g., atmospheric pressure) results in closing the first fluid track (e.g., idle track) and passively trapping air underneath the decoupler.

DETAILED DESCRIPTION

Figure 6:
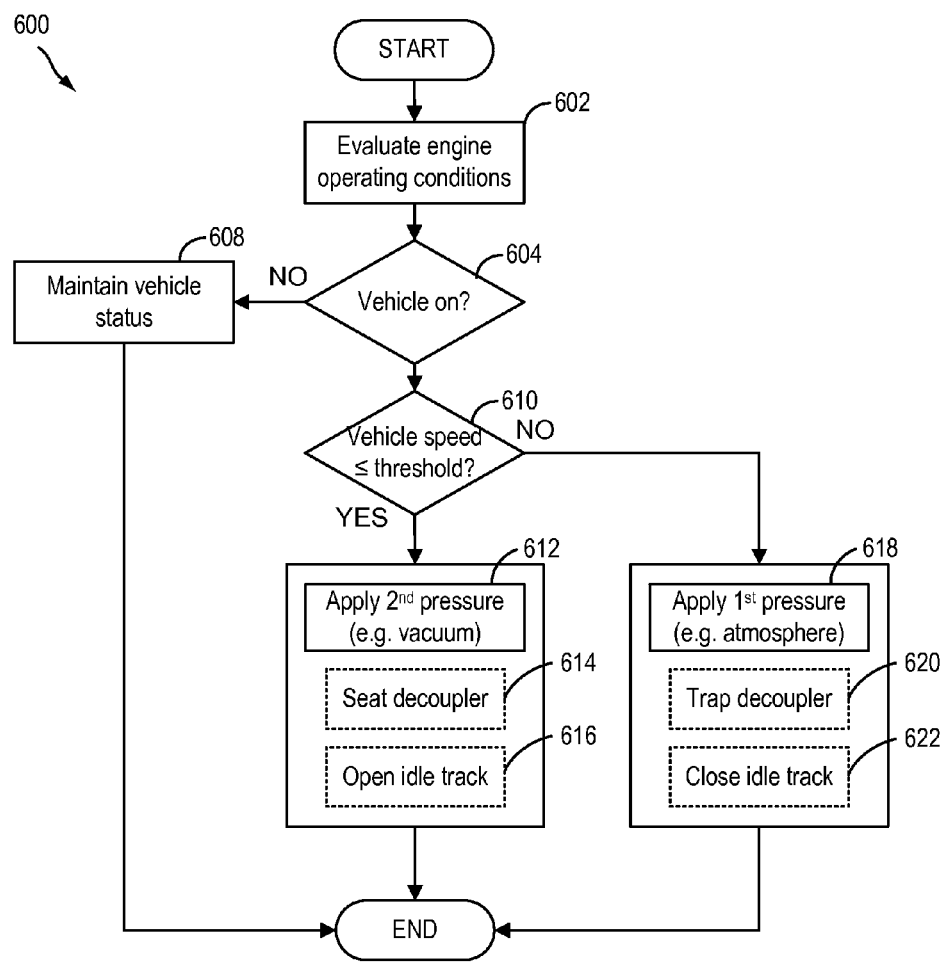
FIG. 6 shows a high level example method for controlling the dual state engine mount depicted in FIGS. 5A-5B.
Figure 7:
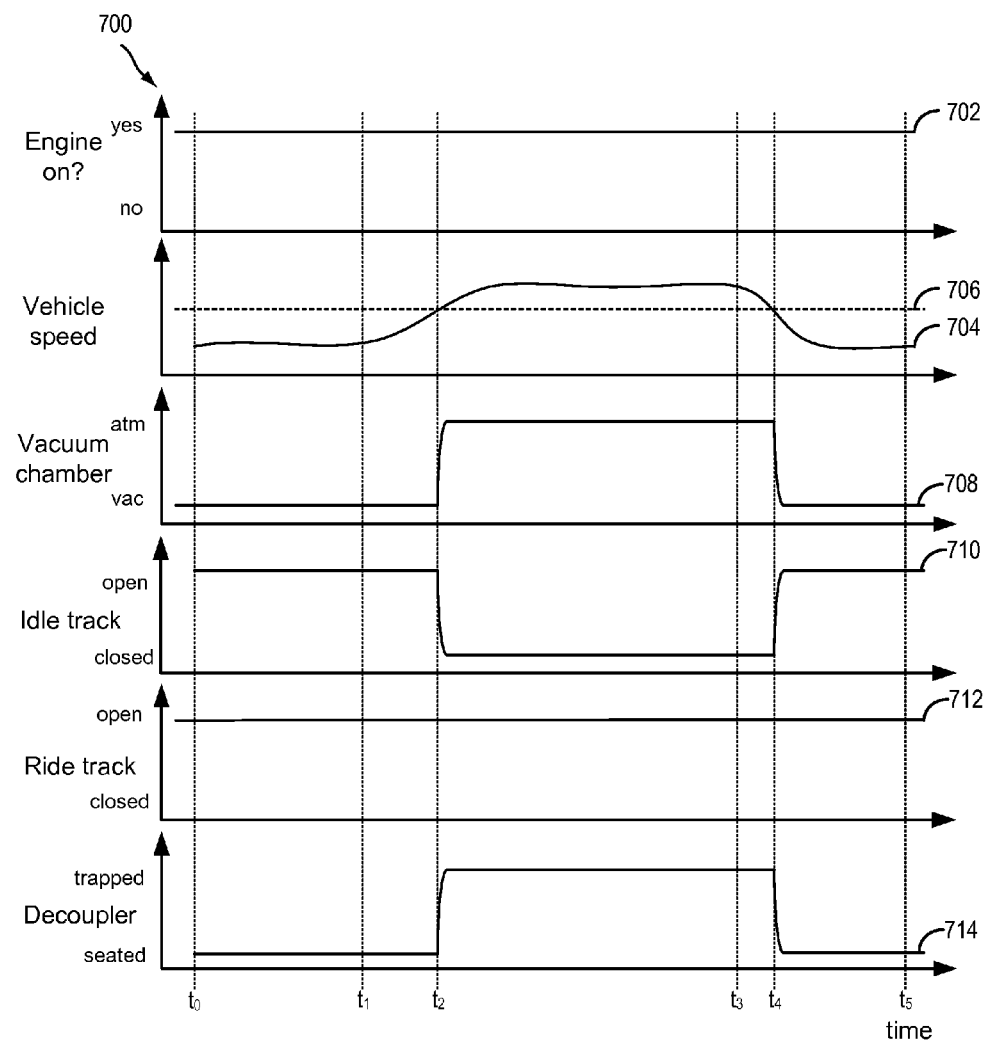
FIG. 7 illustrates an example timeline for controlling the dual state engine mount depicted in FIGS. 5A-5B based on engine operating conditions.

The following description relates to systems and methods for mitigating the reduction in damping available in a vehicle ride mode, wherein the ride mode is defined as a vehicle in operation above a threshold speed, for example a vehicle traveling in excess of 5 mph. A vehicle powertrain system may be supported in a vehicle by a plurality of hydraulic mounts (FIG. 1) that may be configured to smoothen vibrations resulting from engine operation and road conditions. The hydraulic mount may include a rigid support member coupled to the powertrain system, and a rigid external housing coupled to a vehicle frame (FIG. 2). Within the rigid outer housing, the hydraulic mount may include a number of elastic components forming a first fluidic chamber, or high pressure chamber and a second fluidic chamber, or low pressure chamber fluidically separated by a partitioning structure (FIG. 3) with a plurality of fluid tracks enabling fluid flow between the fluid chambers. A typical partitioning structure may include a vacuum chamber, wherein application of a second pressure (e.g., vacuum) during idle mode (e.g., vehicle speed less than a threshold, for example 5 mph) opens the first fluid track, and seats the decoupler element against the partitioning structure (FIG. 4A), and wherein application of a first pressure (e.g., atmospheric pressure) closes a first fluid track (e.g., idle track), and enables movement of a decoupler element (FIG. 4B). However, movement of the decoupler as illustrated in FIG. 4B reduces the amount of damping available in the ride mode. To mitigate the reduction in damping in the ride mode, a dual state hydromount is illustrated wherein application of the second pressure (e.g., vacuum) during idle mode similarly opens the first fluid track, and seats the decoupler element against the partitioning structure (FIG. 5A), yet wherein application of a first pressure (e.g., atmospheric pressure) closes the first fluid track, and passively traps air underneath the decoupler element, thus creating an air spring, or air pocket underneath the decoupler and thereby stiffening the decoupler (FIG. 5B). A method for controlling the dual state hydromount illustrated in FIGS. 5A-5B enables switching of the properties of the dual state hydromount based on engine operating conditions, engine operating conditions comprising an idle mode and a ride mode (FIG. 6). An example timeline for controlling the properties of the dual state hydromount based on engine operating conditions is illustrated in FIG. 7.

Figure 1:
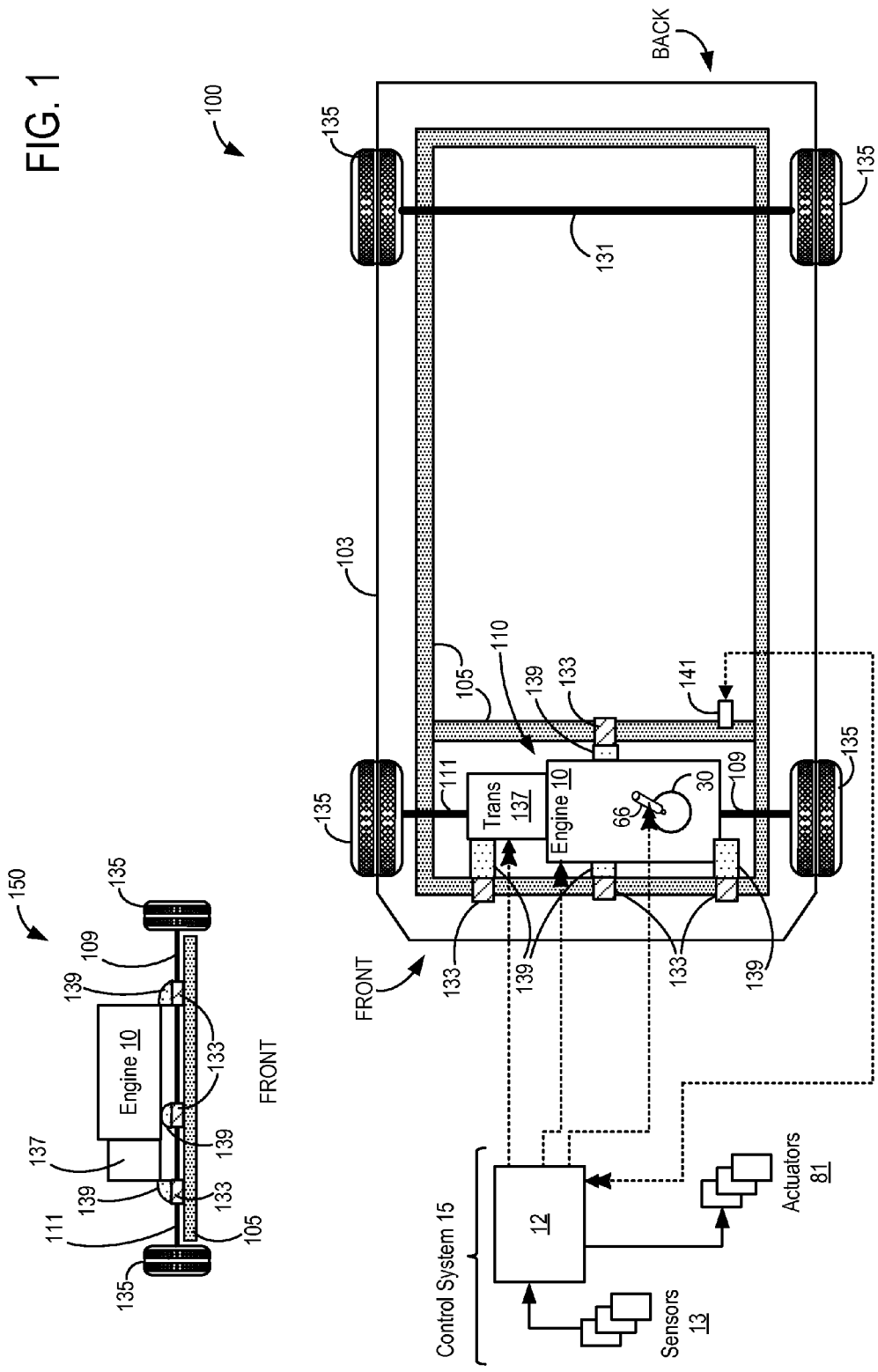
FIG. 1 schematically depicts an embodiment of a vehicle including a vehicle powertrain attached to a vehicle frame via a number of hydraulic mounts.
Figure 2:
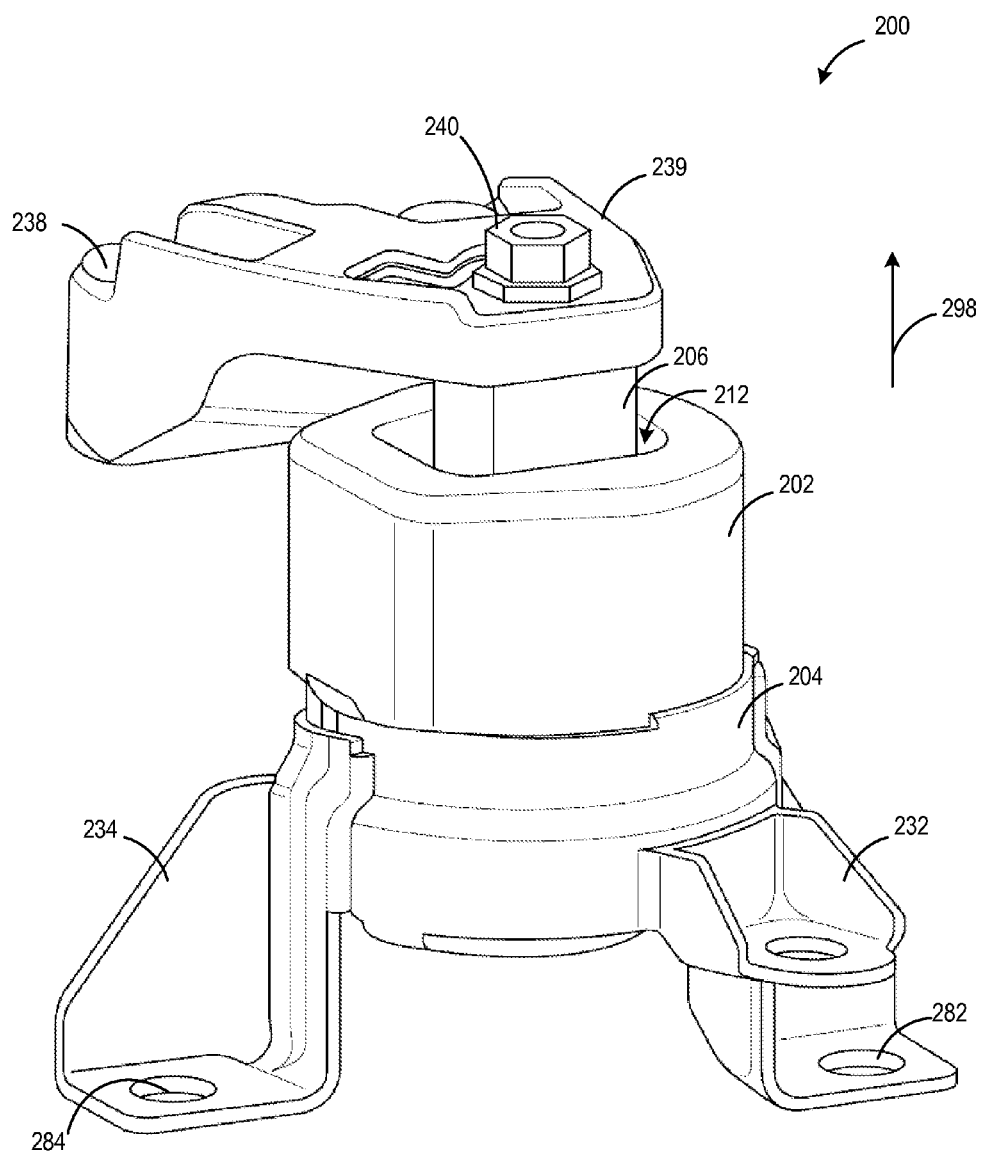
FIG. 2 shows an external view of a hydraulic mount that may be included within the vehicle of FIG. 1.

Turning now to FIG. 1, it schematically depicts an example vehicle system 100 as shown from a top view. Vehicle system 100 comprises a vehicle body 103 with a front end, labeled "FRONT", and a back end labeled "BACK." Vehicle system 100 may include a plurality of wheels 135. For example, as shown in FIG. 1, vehicle system 100 may include a first pair of wheels adjacent to the front end of the vehicle and a second pair of wheels adjacent the back end of the vehicle.

Vehicle system 100 may include an internal combustion engine, such as example engine 10, coupled to transmission 137. Engine 10 and transmission 137 may herein be referred to in combination as a vehicle powertrain 110 or a powertrain 110. It will be appreciated that other vehicle components coupled to one or more of engine and/or transmission 137 may also be included in the vehicle powertrain 110 without departing from the scope of the present invention. Vehicle system 100 is depicted as having a front wheel drive (FWD) transmission where engine 10 drives the front wheels via half shafts 109 and 111. In another embodiment, vehicle system 100 may have a rear wheel drive (RWD) transmission which drives the rear wheels via a driveshaft (not shown) and a differential (not shown) located on rear axle 131.

Engine 10 and transmission 137 may be supported at least partially by frame 105, which in turn may be supported by plurality of wheels 135. As such, vibrations and movements from engine 10 and transmission 137 may be transmitted to frame 105. Frame 105 may also provide support to a body of vehicle system 100 and other internal components such that vibrations from engine operation may be transferred to an interior of the vehicle system 100. In order to reduce transmission of vibrations to the interior of vehicle system 100, engine 10 and transmission 137 may be mechanically coupled via a plurality of members 139 to respective hydraulic mounts 133. As depicted, engine 10 and transmission 137 are mechanically coupled at four locations to members 139 and via members 139 to four hydraulic mounts 133. In other alternate embodiments, a different number of members and hydraulic mounts may be used, without departing from the scope of the present disclosure.

View 150 depicts a view of vehicle system 100 as observed from front end of vehicle system 100. Control system 15 including controller 12 may at least partially control engine 10 as well as vehicle system 100. The controller 12 receives signals from the various sensors 13 of FIG. 1 and employs the various actuators 81 of FIG. 1 to adjust engine operation based on the received signals and instructions stored on a memory of the controller. In the depicted example, controller 12 may receive input data from vibration sensor 141. Vibration sensor 141, in one example, may be an accelerometer. It will be appreciated that vehicle 100 may include a number of additional vibrational sensors affixed to vehicle frame 105, engine 10, transmission 137, hydraulic mounts 133, etc. without departing from the scope of the present invention. Further, control system 15, and controller 12, can send control signals to actuators 81 which may include fuel injector 66 coupled to cylinder 30 in addition to other actuators of engine 10 and transmission 137 not depicted at FIG. 1. Controller 12 may receive input data from the various sensors, process the input data, and trigger the actuators in response to the processed input data based on instruction or code programmed therein corresponding to one or more routines.

With regard to vehicle system 100, noise, vibration, and harshness (NVH) may arise during engine operation, transmission operation, during transitions in engine operating modes, etc. Additionally, NVH may arise as a result of driving over rough (e.g., uneven) surfaces. Hydraulic mounts 133 may be designed to dampen vehicle noise and vibrations across a broad range of frequencies, or alternatively may be designed to dampen specific ranges of vibrational frequencies. In this way, NVH arising from a number of different sources may each be dampened by a common hydraulic engine mount 133. For example, as described above and which will be further elaborated below, hydraulic engine mounts may have a first configuration for idle operation, or idle mode (e.g., vehicle speeds below a predetermined threshold) dampening and a second configuration for motive, or ride mode (e.g., vehicle speeds above a predetermined threshold) engine operation dampening.

Turning now to FIG. 2, an external view of an example hydraulic mount 200 is shown. For example, hydraulic mount 200 may be an example of hydraulic mount 133 shown within vehicle system 100 at FIG. 1. When configured in a vehicle system that is on flat ground (e.g., vehicle system 100 at FIG. 1), hydraulic mount 200 may be oriented in a substantially vertical direction. However, in other configurations, hydraulic mount 200 may be oriented at an oblique angle relative to vertical. As used herein, however, the terms "upper" and "lower" may refer to respective ends of arrow 298, which indicates a directional axis specific to the hydromount. That is to say, arrow 298 provides reference for a relative positioning of components constituting hydromount 200, and not a reference for the orientation of hydromount 200 within a vehicle system. Additionally, an upper end of the hydromount may refer to the end closer toward the head of arrow 298 and a lower end of the hydromount may refer the end closer toward the tail of arrow 298.

Hydraulic mount 200 includes an upper external housing 202 with a central opening 212 formed within a top surface thereof. Upper external housing 202 may be formed from a rigid material, such as a metal or hard plastic. Central opening 212 is configured to receive a fastener or bolt 206, which extends outwardly from a first elastomeric member or main rubber element (not shown, but see FIG. 3) for fastening to a component of the vehicle powertrain (e.g., one of engine 10 or transmission 137 at FIG. 1). Bolt 206 may be formed from a rigid material such as steel or aluminum.

An upper end of bolt 206 may be configured to rotate about the clearance of central opening 212, while the lower end (not shown) may be lodged in a first elastomeric member of the hydraulic mount, and as such the lower end of the bolt may remain relatively stationary compared to the upper end of the bolt. In another example, bolt 206 may extend outwardly from a bearing member (not shown) that is partially encapsulated within the first elastomeric member of the housing, and may be configured to transfer vibrations to the first elastomeric member via the bearing member.

Bolt 206 may be coupled to a rigid upper bracket 239 via a fastener 240. It will be appreciated that upper bracket 239 may be similar to a member 139 described above with regard to FIG. 1. Upper bracket 239 may be formed from one of a metal or a hard plastic. A distal portion 238 of the upper bracket 239 may be coupled to a vehicle powertrain component (e.g., coupled to the powertrain component at a flange affixed thereto) via a fastener, in a manner generally known in the art.

Lower external housing 204 may be fastened (e.g., mechanically coupled) to upper housing 202. Lower housing 204 may be formed from a rigid material such as one of a metal or hard plastic. A coupling of the lower housing to a vehicle frame (e.g., 105 at FIG. 1) may be achieved via a plurality of lower brackets. In this way, the external housing may remain structurally rigid (e.g., substantially non-compressible), and any vibrations absorbed from the vehicle powertrain or vehicle frame may be transferred to the first elastomeric member within the external housing, said first elastomeric member configured to dampen the vibrations.

Shown in FIG. 2 are first lower bracket 232 and second lower bracket 234. It will be appreciated that still further brackets may be affixed to lower housing 204 in a similar manner to brackets 232 and 234 without departing from the scope of the invention. The lower brackets may be formed from metal, such as steel. However, other materials may be used to form the lower brackets without departing from the scope of the present invention. First lower bracket 232 is shown integrally formed with lower housing 204. A bolt (not shown) may couple (e.g., mechanically) lower bracket 232 to a vehicle frame via hole 282. Second lower bracket 234 is shown affixed to, but not integrally formed with, lower housing 204, and may similarly be coupled to the vehicle frame via hole 284.

FIG. 3 shows a cross-sectional view 300 of a hydraulic mount (e.g., hydraulic mount 133 at FIG. 1 or hydraulic mount 200 at FIG. 2). As used herein, the terms "upper" and "lower" may refer to respective ends of arrow 398, as described above with reference to arrow 298 in FIG. 2. It will be appreciated that arrow 398 may provide a reference for the relative positioning of components within the hydromount, as described above with reference to arrow 298.

A hydromount assembly may include an external housing 302 (e.g., similar to 202 at FIG. 2) dimensioned to receive a first elastomeric member or main rubber element 304 that is generally shaped as a truncated cone, and primarily made of an elastomeric material, such as an elastic rubber as is conventional in the art. A bolt 306 (e.g., similar to 206 at FIG. 2) extends outwardly from the first elastomeric member for fastening to the powertrain or engine (not shown, but see FIG. 2) in a manner generally known in the art. In the depicted example, bolt 306 with a metal bearing member 308 of which at least a lower portion encapsulated within the first elastomeric member 304. In addition, a lower peripheral portion of the first elastomeric member may include a stiffener, such as metallic stiffener 310, molded within the first elastomeric member to add rigidity and support. In this way, vibrations and/or displacements from the powertrain may be transferred to the first elastomeric member 304 of the hydraulic mount.

As discussed above with regard to FIG. 2, the first elastomeric member is received within the upper external housing 302 so that the bolt 306 extends through a central opening 312 in the restrictor. The lower surface 305 of the first elastomeric member 304 forms a portion of a first or upper fluid chamber 316, namely the high pressure side, of the engine mount. First fluid chamber 316 may be filled with a hydraulic fluid (e.g., glycol). The remainder of the first fluid chamber 316 is defined by the inertia track assembly 320, more specific details of which will be described below with regard to FIGS. 4A-5B. It will be understood that inertia track assembly 320 may herein also be referred to as a partitioning structure. An outer portion of an upper surface of the partitioning structure (denoted by reference numeral 322) abuttingly and sealingly engages the first elastomeric member 304 in order to seal the first fluid chamber 316. A second outer portion of the partitioning structure along the lower surface denoted by reference numeral 324 is sealingly engaged by a second elastomeric member 330 (a rubber boot or diaphragm) and particularly an upper peripheral portion 332 thereof. Lower surface 324 of the partitioning structure 320, in combination with second elastomeric member 330, form a second or lower fluid chamber 350. Second fluid chamber may too be filled with a hydraulic fluid (e.g., glycol). The second elastomeric member 330 is protected by a diaphragm cover 334, preferably formed of a more rigid material than the elastomeric diaphragm, and that matingly engages (e.g., mechanically couples to) the lower external housing 340. When the lower housing 340 is fastened to the upper housing, the lower peripheral edge of the first elastomeric member 304 and the peripheral portion 332 of the second elastomeric member sealingly engage opposite sides or faces 322, 324, respectively, of the partitioning structure 320.

The partitioning structure and operation of a typical engine mount 300 will be briefly described, and elaborated in more detail with regard to FIGS. 4A-4B, and expanded on with regard to FIGS. 5A-5B. As indicated, the first fluid chamber 316 and the second fluid chamber 350 are fluidly coupled together by partitioning structure 320. Partitioning structure 320 comprises a channel plate 301, a decoupler 360 (e.g., compliant membrane), a first fluid track 370 (e.g., idle track), a second fluid track 375 (e.g., ride track), and a vacuum chamber 365. Vacuum chamber 365 may be coupled to the partitioning structure such that the vacuum chamber may defined by passageways in the channel plate 301, and wherein a segment of the vacuum chamber is comprised of the decoupler 360. Vacuum chamber 365 may be fluidly connected to a source of either vacuum, or atmospheric pressure, via conduit 380. Vacuum may be provided by any available source of vehicle vacuum, for example intake manifold vacuum. When vacuum chamber 365 is at atmospheric pressure (e.g., a first pressure), decoupler 360 may be free to move. Furthermore, when vacuum chamber 365 is at atmospheric pressure, a first vacuum actuated valve 355 is seated in an upper position within channel plate 301 such that the first fluid track 370 is closed. When in such a configuration, the decoupler 360 may breathe in response to vibrations or displacements, and fluid flow between first fluid chamber 316 and second fluid chamber 350 may only be allowed via the second fluid track 375. As such, engine mount 300 typifies decoupled hydromount function when vacuum chamber 365 is at atmospheric pressure. However, the decoupled state of the hydromount reduces the amount of damping available in the ride mode, thereby degrading secondary ride, as will be discussed in further detail below.

Alternatively, application of vacuum to vacuum chamber 365 serves to seat decoupler 360 against channel plate 301, indicated by arrow 386, and furthermore positions first vacuum actuated valve in a lower position, indicated by arrow 385. As such, first fluid track 370 is opened, and decoupler 360 is not permitted to move, or breathe. Accordingly, fluid flow between first fluid chamber 316 and second fluid chamber 350 occurs via the first fluid track 370, as first fluid track 370 represents the path of least resistance through the inertia track assembly 320, thus providing a soft engine mount for idle mode operation.

As indicated, application of either vacuum or atmospheric pressure to vacuum chamber 365 enables engine mount 365 to operate in two distinct modes, which will be elaborated in more detail below with regards to FIGS. 4A-5B.

Turning to FIGS. 4A-4B, a simplified illustration of a hydromount is shown under a first condition wherein an applied vacuum is used to immobilize the decoupler and open the idle track (FIG. 4A), and under a second condition wherein the decoupler is free to move, the idle track is maintained closed, and the ride track is maintained open (FIG. 4B).

FIG. 4A shows a simplified schematic cross-sectional view of an engine mount embodying the teachings described in connection with FIG. 3. Engine mount 400 comprises first elastomeric member 406, made of an elastomeric material. The first elastomeric member 406 is received within an external housing as described above in FIG. 3 (not shown). The lower surface of first elastomeric member 406 forms a portion of a first or upper fluid chamber 425, or the high pressure side, of the engine mount. First fluid chamber 425 may be filled with hydraulic fluid (e.g., glycol). A second fluid chamber 430 may too be filled with hydraulic fluid (e.g., glycol), and received within an external housing as described above in FIG. 3 (not shown). The first fluid chamber 425 and second fluid chamber 430 are fluidly coupled together by means of an inertia track assembly 412, also referred to as a partitioning structure, comprising a channel plate 410. Partitioning structure further comprises a decoupler 420 (e.g., compliant membrane), a first fluid track 435 (e.g., idle track), a second fluid track 440 (e.g., ride track), and a vacuum chamber 449. An first vacuum-actuated valve 405 is positioned within channel plate 410 for opening and closing idle track 435 as will be described further below. In one example, first vacuum-actuated valve comprises a vacuum-actuated rubber valve. Finally, a first vacuum conduit 413 through channel plate 410 couples either a first pressure 447 (e.g., atmospheric) or a second pressure 448 (e.g. vacuum) to vacuum chamber 449, via two-way valve 446.

The operation of engine mount 400 may be described as follows. In response to engine or road excitation, as vibrations or displacements are received into the mount from the powertrain and/or the vehicle frame, fluid is pumped from the first fluid chamber 425 through the partitioning structure 412 comprising channel plate 410 in different ways depending on the presence or absence of vacuum in the vacuum chamber 449. As alluded to earlier, the degree of dynamic stiffness and damping of engine mount 400 depends, in part, on the ease with which the fluid flows between the first fluid chamber 425 and the second fluid chamber 430 and the masses of fluid in the first fluid track (idle track) 435 and the second fluid track (ride track) 440. The fluid in second fluid track 440 and first fluid track 435 participates in a resonant system whose frequency is based on such properties as the mass of fluid in the track, elasticity of the first elastomeric member 406 enclosing the first fluid chamber 425, elasticity of the second elastomeric member (e.g., 330 in FIG. 3) enclosing the second fluid chamber, the volumetric dilation of the chambers, and fluid volumetric displacements. Because the ease of flow through the first fluid track 435 and second fluid track 440 depends on track length, cross-section, surface friction, and fluid entry and exit area constrictions and refractions, the tracks can be tuned to provide a differential resistance to fluid flow. As illustrated, first fluid track 435 may thus comprise a pathway allowing for relatively low-resistance flow between the first fluid chamber 425 and the second fluid chamber 430. Alternatively, second fluid track 440 may thus comprise a pathway allowing for relatively high-resistance flow between the first fluid chamber 425 and the second fluid chamber 430 via an elongated (e.g., spiraling or serpentine) passage and further comprising a smaller diameter than the first fluid track 435 pathway.

Application of second pressure (e.g., vacuum) 448 to vacuum chamber 449 as illustrated in FIG. 4A causes decoupler 420 to seat against channel plate 410 thus restricting movement of decoupler 420. Further, application of the second pressure 448 to vacuum chamber 449 results in actuation of the first vacuum-actuated valve 405, such that the first fluid track 435 is opened. As such, fluid from the first fluid chamber 425 flows through the idle track 435, rather than through the ride track 440 because the dynamic resistance of the ride track 440 is greater than that of the idle track 435. As such, flow through the idle track 435 leads to a favorable reduction in the dynamic stiffness at a targeted range of frequencies typically encountered during idle operation.

Now turning to FIG. 4B a simplified schematic cross-sectional view of an engine mount 400 is shown illustrating the operation of mount 400 under conditions where the vehicle is in ride mode. Components that are the same as those illustrated in FIG. 4A are denoted by the same reference number.

Application of a first pressure (e.g., atmosphere) 447 to vacuum chamber 449 as illustrated in FIG. 4B enables movement of decoupler 420, as the decoupler 420 is no longer held in place via external vacuum 448. Additionally, application of a first pressure 447 to vacuum chamber 449 results in the seating of the idle bypass mechanism 405 in the channel plate 410 such that the first fluid track 435 is maintained closed. As such, the decoupler 420 is permitted to breathe in response to vibrations or displacements, and no fluid flows through the first fluid track 435. In such a configuration, engine mount 400 reverts to a typical decoupled hydromount in function, wherein fluid flow is only through the ride track 440. A more compliant decoupler, such as that indicated in FIG. 4B may help for events like lugging. However, the decoupled state of the hydromount in the ride mode reduces the amount of damping available, thereby degrading secondary ride, secondary ride defined herein as low amplitude, higher frequency vibrations or displacements.

In order to mitigate the reduction in damping available in ride mode resulting from the decoupled state of the hydromount, an air pocket or air spring may be introduced underneath the decoupler such that the stiffness of the air pocket adds to decoupler stiffness, rather than venting the area underneath the decoupler to atmosphere. Now turning to FIG. 5A-5B, a simplified schematic illustration of an engine mount 500 details concepts for enabling vacuum-actuated opening of the idle track while simultaneously restricting the mobility of the decoupler (FIG. 5A), such that the function of the hydromount is unchanged from that introduced in FIG. 4A for the idle mode. However, removal of the vacuum closes the idle track while passively introducing an air pocket underneath the decoupler (FIG. 5B), thus mitigating the loss of damping observed under conditions wherein the area underneath the decoupler is otherwise vented to atmosphere in the ride mode. In FIGS. 5A-5B, components that are the same as those illustrated in FIGS. 4A-4B are denoted by the same reference number.

In FIG. 5A, a second vacuum-actuated valve 565 is shown configured as an integral part of channel plate 410 such that, upon introduction of a second pressure 448 (e.g., vacuum) to vacuum chamber 449, second vacuum-actuated valve 565 is opened, and decoupler 420 is seated against channel plate 410. In one example, the second vacuum-actuated valve may be a rubber valve, although other vacuum-actuated valve configurations have been contemplated. Furthermore, application of the second pressure 448 to vacuum chamber 449 results in actuation of the first vacuum-actuated valve 405, such that the first fluid track 435 is opened. As described above with regard to FIG. 4A, fluid from the first fluid chamber 425 may preferentially flow through the first fluid track 435 due to the greater dynamic resistance of the second fluid track 440 than that of first fluid track 435, thereby reducing the dynamic stiffness of the hydromount 500.

Further illustrated in FIG. 5A is a one way check valve 560 that enables the flow of air in one direction, but prevents the flow of air in the other direction. One way check valve is shown bounded by a first air passage 506, and a second air passage 507. As such, channel plate 410 includes first air passage 506 coupled to second air passage 507 via one way check valve 560. As illustrated, first air passage 506 and second air passage 507 are fluidically coupled to vacuum chamber 449. As will be described in further detail with regard to FIG. 5B, check valve 560 shown in FIG. 5A may be configured such that, in the absence of applied vacuum, air may travel from air passage 506 to air passage 507, but is prevented from flowing in the direction from air passage 507 to air passage 506.

Configured as such, FIG. 5A illustrates an engine mount 500 with additional air passages 506 and 507, wherein sandwiched between them is a one way check valve 560. Upon actuation of the second pressure 448, the second pressure 448 may additionally result in a vacuum in air passage 506 and 507, with no functional resulting effect. Thus, FIG. 5A illustrates an engine mount with the additional features of an added check valve 560 bounded by two air passages 506 and 507, and an additional vacuum-actuated valve 565, yet responsive to the introduction of the second pressure 448, the hydromount 500 illustrated in FIG. 5A functions precisely as the hydromount in FIG. 4A. More specifically, in idle mode, actuation of a second pressure 448 seats the decoupler 420 against the channel plate 410 such that its movement is restricted, while the idle track is opened via the actuation of the idle track bypass mechanism 405. In this way, hydromount 500 retains the desirable reduction in the dynamic stiffness at a targeted range of frequencies typically encountered during idle operation.

Turning now to FIG. 5B, a simplified schematic cross-sectional view of an engine mount 500 is shown illustrating the operation of mount 500 under conditions where the vehicle is in ride mode. Components that are the same as those illustrated in FIG. 5A are denoted by the same reference number.

Application of a first pressure 447 (e.g., atmosphere) to vacuum chamber 449 as illustrated in FIG. 5B results in closing of the first fluid track 435 and creation of an air spring under the decoupler 420, as opposed to hydromount 400 illustrated in FIG. 4B, wherein application of the first pressure resulted in a freely movable decoupler. More specifically, upon the removal of the second pressure 448 (e.g., vacuum) and application of the first pressure 447 (e.g., atmosphere), via the switching of two-way valve 446, for example, pressure in vacuum chamber 449 may thus be relieved to atmosphere, resulting in the seating of idle bypass mechanism 405 in the channel plate 410 such that the idle track 435 is maintained closed. Additionally, in the absence of external vacuum in the vacuum chamber 449, vacuum-actuated valve 565 closes. As described above with regard to FIG. 5A, one-way check valve 560 enables air flow in one direction but prevents air flow in the opposite direction. Configured as described in FIG. 5A, air may thus flow from atmosphere indicated by dashed arrows 568, through first air passage 506, and into second air passage 507, via one way check valve 560. Once in air passage 507, air may form an air pocket 509, or air spring, underneath the decoupler 420 defined by air chamber 515 such that the stiffness of the air pocket adds to the decoupler stiffness. For example, the trapping of air underneath the decoupler may result in a predetermined stiffness of the decoupler, the predetermined stiffness of the decoupler determined by the length and volume of the air chamber 515, the air chamber comprising the second air passage and a segment of the vacuum chamber coupled between the closed vacuum actuated check valve 565 and the decoupler 420. As one example, the trapping of air underneath the decoupler may result in a stiffness of the decoupler that is greater than the stiffness of the decoupler in fluid communication with atmosphere, but less than the stiffness of the decoupler when in a stationary position in contact with the partitioning structure. Air introduced underneath the decoupler may be prevented from escaping due to the one way check valve 560 preventing air flow in the direction comprising flow from air passage 507 to air passage 506, and additionally air may be prevented from escaping due to the closure of vacuum-actuated check valve 565. As such, removal of the second pressure 448 (e.g., vacuum) and application of the first pressure 447 (e.g., atmosphere) results in the passive introduction of air underneath decoupler 420 thus resulting in a stiffness of decoulper 420 related to the stiffness of air pocket 509. Futhermore, removal of the second pressure 448 and introduction of the first pressure 447 results in the simultaneous closing of the idle track 435 via the seating of idle bypass mechanism 405 in the channel plate 410. As such, by introducing air pocket 509 under decoupler 420, engine mount 500 mitigates the reduction in damping available in ride mode otherwise observed for fully decoupled hydromounts vented to atmosphere, for example hydromount 400 illustrated in FIG. 4B. Importantly, the introduction of air pocket 509 under decoupler 420 is achieved passively by hydromount 500, thus alleviating a requirement for additional active control.

A flow chart for a high-level example method 600 for controlling a dual state vacuum switchable mount is shown in FIG. 6. More specifically, method 600 includes indicating vehicle speed, and switching the characteristics of the mount according to whether the vehicle speed is above, or below, a predetermined threshold speed. Method 600 will be described with reference to the systems described herein and shown in FIGS. 1-5B, though it should be understood that similar methods may be applied to other systems without departing from the scope of this disclosure. Method 600 may be carried out by a controller, such as controller 12 in FIG. 1, and may be stored at the controller as executable instructions in non-transitory memory. Instructions for carrying out method 600 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the method described below.

Method 600 begins at 602 and includes evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc. At 604, method 600 includes indicating whether the vehicle is on. In some examples, indicating whether the vehicle is on may include indicating that the vehicle is being operated via the engine. In other examples, indicating whether the engine is on may include indicating that the vehicle is operating in battery only mode. If the vehicle is not on, method 600 proceeds to 608 and includes maintaining vehicle status. For example, as the vehicle is not indicated to be currently in operation, vehicle vibrations are not an issue and as such no adjustments to the switchable engine mount characteristics are indicated. Method 600 may then end.

If a vehicle-on condition is indicated at 604, method 600 proceeds to 610 and includes indicating whether vehicle speed is less than or equal to a predetermined threshold speed. For example, the predetermined threshold speed may be a speed wherein an engine mount with specific predetermined characteristics effectively reduces noise, vibration, and harshness for the indicated operating conditions. In one example, the threshold speed may be five miles-per-hour (mph) or less, though other threshold speeds have been contemplated. If at 610 it is indicated that the vehicle speed is less than or equal to the predetermined threshold, method 600 proceeds to 612 and includes applying or maintaining a second pressure (e.g., vacuum) to the engine mount vacuum chamber (e.g., vacuum chamber 449). As described above with regard to FIG. 5A, application of the second pressure results in an opening of the second vacuum actuated valve (e.g., 565) thus coupling the second pressure to the decoupler such that the decoupler may be seated 614 and held down against the channel plate such that its movement is restricted. Furthermore, application of the second pressure functions to open the first vacuum actuated valve (e.g. 405) thereby opening the first fluid track, or idle track (e.g., 435) 616. As such, as described above with regard to FIG. 4A, fluid from the first fluid chamber (e.g., 425) flows through the first fluid track, or idle track, rather than through the second fluid track, or ride track, because of the lower dynamic resistance of the idle track compared to the ride track. Thus, via flow through the idle track a reduction in the dynamic stiffness of the engine mount may be achieved at the targeted range of frequencies typically encountered during idle operation.

Returning to 610, if it is determined that vehicle speed is not less than or equal to a threshold, method 600 proceeds to 618 and includes applying a first pressure (e.g., atmosphere) to the engine mount vacuum chamber (e.g., vacuum chamber 449). As described above with regard to FIG. 5B, application of a first pressure to the engine mount vacuum chamber results in passive creation of an air spring underneath the decoupler, thus trapping the decoupler in a secondary position 620, while simultaneously closing the first fluid track, or idle track 622. More specifically, in the absence of external vacuum in the vacuum chamber, the second vacuum actuated valve (e.g., 565) closes, and the first vacuum actuated valve (e.g. 405) similarly closes such that the first vacuum actuated valve is seated in the channel plate thus closing the idle track. Furthermore, one way check valve (e.g., 560) enables the flow of air from the first air passage (e.g., 506) to the second air passage (e.g. 507) thus creating an air spring underneath the decoupler, the stiffness of the air pocket adding to the decoupler stiffness. As such, the passive introduction of an air spring under the decoupler mitigates a reduction in damping available in the ride mode otherwise observed for fully decoupled hydromounts vented to atmosphere, such as hydromount 400 (FIG. 4B), without a requirement for additional active control.

FIG. 7 shows an example timeline 700 for controlling a dual state vacuum switchable mount depending on whether the indicated speed is above, or below, a predetermined threshold speed according to the methods described herein and with regard to FIG. 6, and as applied to the systems described herein and with reference to FIG. 5A-5B. Timeline 700 includes plot 702, indicating whether the vehicle is on, over time. Timeline 700 further includes plot 704, indicating vehicle speed, over time. Line 706 represents a threshold speed wherein specific engine mount characteristics are desirable at or below the predetermined threshold speed, and wherein different engine mount characteristics are desirable above the predetermined threshold speed. Timeline 700 further includes plot 708, indicating whether a first pressure (e.g., atmosphere) or a second pressure (e.g., vacuum) is applied to a vacuum chamber housed within a partitioning structure, over time. Timeline 700 further includes plot 710, indicating whether the first fluid track (e.g., idle track) is open or closed, and plot 712, indicating whether the second fluid track (e.g., ride track) is open or closed, over time. Timeline 700 further includes plot 714, indicating whether the decoupler is seated against the partitioning structure, or trapped in a second position via the creation of an air spring underneath the decoupler, over time.

At time $t_0$ the vehicle is in operation as indicated by plot 702. Vehicle speed, indicated by plot 704, is below a threshold speed, represented by line 706. As such, a second pressure (e.g., vacuum) is applied to the vacuum chamber housed within the partitioning structure of the dual state switchable engine mount, indicated by plot 708. As vacuum is applied to the vacuum chamber, a first vacuum actuated valve (e.g., 405 in FIG. 5A) is actuated, thus the first fluid track, or idle track, is in on open configuration, as indicated by plot 710. Furthermore, application of the second pressure opens a second vacuum actuated valve (e.g., 565 in FIG. 5A), thus coupling the second pressure to the decoupler, resulting in the decoupler being seated in a stationary position indicated by plot 714, held tight against the partitioning structure. Finally, the ride track is open, indicated by plot 712, as application of a second pressure (e.g., vacuum) or a first pressure (e.g., atmospheric pressure) does not directly influence an open or closed state of the ride track. In this conformation, as indicated above, the hydromount embodies the desirable reduction in dynamic stiffness at the range of frequencies typically encountered during idle operation.

Between time $t_0$ and $t_1$ the vehicle speed remains below a threshold speed and does not change. In one example, a vehicle remaining below a threshold speed without changing speed may indicated a vehicle in operation, stopped for a duration. In other examples, the vehicle may be driving below a threshold speed without speeding up or slowing down for a duration. At time $t_1$ vehicle speed begins increasing, and at time $t_2$ vehicle speed crosses the threshold speed. As the vehicle speed has crossed the threshold, the first pressure (e.g., atmospheric pressure) is applied to the vacuum chamber, indicated by plot 708. As the pressure in the vacuum chamber changes to atmospheric pressure, the first vacuum-actuated valve (e.g., 405 in FIG. 5B) is no longer held down and thus the idle track transitions from an open to a closed conformation, indicated by plot 710. Furthermore, the second vacuum-actuated valve (e.g., 565 in FIG. 5B) is additionally no longer held open, and it too closes. As such, air may be directed through a first air passage (e.g., 506 in FIG. 5B), to a second air passage (e.g., 507 in FIG. 5B) via a one way check valve (e.g., 560 in FIG. 5B) wherein the air becomes trapped underneath the decoupler, such that the decoupler assumes a secondary position, or trapped conformation, indicated by plot 714, supported by the air spring (or air pocket) underneath the decoupler. In this conformation, the dual state hydromount mitigates the reduction in damping available in ride mode otherwise observed for fully decoupled hydromounts vented to atmosphere (FIG. 4B). Importantly, the introduction of an air spring underneath the decoupler is achieved passively without additional active control.

Between time $t_2$ and $t_3$ vehicle speed remains above the threshold speed, and as such the vacuum chamber remains at atmospheric pressure, the idle track is maintained closed, and the decoupler is maintained in a secondary or trapped conformation with an air spring underneath the decoupler. At time $t_3$ vehicle speed begins decreasing, and at time $t_4$ vehicle speed crosses the threshold speed. As such, a second pressure (e.g., vacuum) is applied to the vacuum chamber. As vacuum is applied to the vacuum chamber, the first vacuum-actuated valve is actuated, thus opening the idle track, indicated by plot 710. Furthermore, application of vacuum to the vacuum chamber results in the opening of the second vacuum-actuated valve thus coupling the second pressure to the decoupler, resulting in the decoupler being seated in a stationary position indicated by plot 714, held tight against the partitioning structure. Between time $t_4$ and $t_5$ vehicle speed remains below the threshold, thus the idle track is maintained open with the decoupler seated against the partitioning structure thus resulting in a reduction in dynamic stiffness at the range of frequencies typically encountered during idle operation.

In this way, the introduction of an air pocket or air spring underneath the decoupler mitigates the reduction in damping available in the ride mode resulting from the decoupled state of the hydromount if the air underneath the decoupler is vented to atmosphere rather than being trapped. By introducing an air spring underneath the decoupler, the stiffness of the decoupler is greater than that of a decoupler in communication with atmosphere, but less stiff than a decoupler held in a stationary position seated against the partitioning structure. As such, a decoupler with an increased stiffness due to an air spring provides compliance for noise, vibration, and harshness (NVH)-type excitation, while not losing damping to the extent of a decoupled hydromount. The technical effect of creating an air spring underneath the decoupler when the first pressure (e.g., atmosphere) is applied to the vacuum chamber in the ride mode is to enable the creation of the air spring passively. By introducing a second vacuum-actuated valve and a one-way check valve bounded by a first air passage and a second air passage in the partitioning structure of the dual state hydromount, when the first pressure (e.g., atmosphere) is applied to the vacuum chamber, an air spring may be passively introduced underneath the decoupler in the ride mode, thus eliminating the need for additional active control. Furthermore, the addition of the second vacuum-actuated valve and the one way check valve bounded by the first air passage and the second air passage in the partitioning structure enables the opening of a first fluid track and seating of the decoupler element against the partitioning structure in the idle mode in similar fashion to technology currently in use, thus operation in the idle mode is not compromised as a result of the additional components.

The systems described herein and with reference to FIGS. 1-5B, along with the methods described herein and with reference to FIG. 6 may enable one or more systems and one or more methods. In one example, a method comprises in a first condition, evacuating a vacuum chamber housed within a partitioning structure of a hydraulic engine mount to open a first fluid track and a second fluid track in parallel to maintain a decoupler seated against the partitioning structure; and in a second condition, applying atmospheric pressure to the vacuum to close the first fluid track while maintaining open the second fluid track to trap air passively underneath the decoupler. In a first example of the method, the method includes wherein the partitioning structure separates a first fluid chamber and a second fluid chamber, the first fluid chamber and the second fluid chamber each housing hydraulic fluid, and with the first fluid track and second fluid track enabling the flow of fluids therebetween. A second example of the method optionally includes the first example and further includes wherein in the first condition, the application of vacuum to the vacuum chamber opens the first fluid track via the opening of a first vacuum-actuated valve, and the application of vacuum seats the decoupler by coupling the vacuum to the decoupler via the opening of a second vacuum actuated valve. A third example of the method optionally includes one or more or each of the first and second examples and further includes wherein, in the second condition, the application of atmospheric pressure to the vacuum closes the first fluid track via the closing of the first vacuum-actuated valve, and the application of atmospheric pressure passively traps air under the decoupler by closing the second vacuum actuated valve and directing the flow of air through a first air passage to a second air passage via a one-way check valve, the second air passage in fluid communication with the decoupler and the closed second vacuum actuated valve. A fourth example of the method optionally includes any one or more or each of the first through third examples and further includes wherein the first air passage and second air passage are housed within the partitioning structure, and wherein the first air passage is positioned below the second vacuum actuated valve, and wherein the second air passage is positioned above the second vacuum actuated valve. A fifth example of the method optionally includes any one or more or each of the first through fourth examples and further includes wherein the first fluid track has a lower resistance to fluid flow than the second fluid track. A sixth example of the method optionally includes any one or more or each of the first through fifth examples and further includes wherein the first condition comprises selectively applying vacuum to the vacuum chamber in response to conditions wherein vehicle speeds are less than or equal to a predetermined speed (i.e. idle mode); and wherein the second condition comprises selectively applying atmospheric pressure to the vacuum chamber in response to conditions wherein vehicle speeds are greater than a predetermined speed (i.e. ride mode).

Another example method for controlling a hydraulic engine mount comprises, a partitioning structure coupled between a first elastomeric member and a second elastomeric member such that a first fluid chamber is formed with the first elastomeric member and a second fluid chamber is formed with the second elastomeric member, the first and second fluid chambers housing a hydraulic fluid; a decoupler positioned on the partitioning structure and exposed to the first fluid chamber and configured to selectively assume a stationary position in contact with the partitioning structure or a secondary position not in contact with the partitioning structure; a vacuum chamber, coupled within the partitioning structure and configured such that the chamber may be selectively coupled to either a first pressure (e.g., atmosphere) or a second pressure (e.g., vacuum); a second vacuum actuated valve housed within the vacuum chamber such that, when the second pressure is applied to the vacuum chamber, the second vacuum actuated valve opens thereby coupling the second pressure to the decoupler such that the decoupler assumes the stationary position in contact with the partitioning structure, and when the first pressure is applied to the vacuum chamber, the second vacuum actuated valve closes; a first air passage and a second air passage housed within the partitioning structure and fluidly connected to the vacuum chamber, the first air passage fluidly connected to the vacuum chamber at a position below the second vacuum actuated valve near the second fluid chamber, and the second fresh air passage fluidly connected to the vacuum chamber at a position above the second vacuum actuated valve near the first fluid chamber; a one way check valve coupling the first air passage and the second air passage within the partitioning structure such that when the first pressure is applied to the vacuum chamber, air is directed through the first air passage to the second air passage via the one way check valve wherein the air is trapped under the decoupler in an air chamber, prevented from escaping due to the closed second vacuum actuated valve, thus resulting in the decoupler assuming the secondary position not in contact with the partitioning structure. In a first example of the method, the method includes wherein the partitioning structure further comprises a first fluid passageway and a second fluid passageway through the partitioning structure to enable fluid flow between the first fluid chamber and the second fluid chamber, the first fluid passageway having a lower resistance to fluid flow than the second fluid passageway. A second example of the method optionally includes the first example and further comprises a first vacuum actuated valve housed within the vacuum chamber such that, when the second pressure is applied to the vacuum chamber, the first fluid passageway through the partitioning structure is opened, and when the first air pressure is applied to the vacuum chamber, the first fluid passageway is closed. A third example of the method optionally includes any one or more or each of the first and second examples and further includes wherein application of the second pressure to the vacuum chamber thereby enables the routing of fluid flow from the first fluid chamber to the second fluid chamber via the first fluid passageway, the result of the first fluid passageway having the lower resistance to fluid flow than the second fluid passageway. A fourth example of the method optionally includes any one or more or each of the first through third examples and further includes wherein application of the second pressure to the vacuum chamber simultaneously results in the decoupler assuming the stationary position and the first fluid passageway through the partitioning structure being opened. A fifth example of the method optionally includes any one or more or each of the first through fourth examples and further includes wherein application of the first pressure to the vacuum chamber simultaneously results in the closing of the first fluid passageway and the trapping of air underneath the decoupler. A sixth example of the method optionally includes any one or more or each of the first through fifth examples and further includes wherein the trapping of air underneath the decoupler responsive to application of the first pressure is achieved passively without active control. A seventh example of the method optionally includes any one or more or each of the first through sixth examples and further includes wherein the trapping of air underneath the decoupler results in a predetermined stiffness of the decoupler. An eighth example of the method optionally includes any one or more or each of the first through seventh examples and further includes wherein the predetermined stiffness of the decoupler is determined by the length and volume of the air chamber, the air chamber comprising the second air passage and a segment of the vacuum chamber coupled between the closed second vacuum actuated valve and the decoupler. A ninth example of the method optionally includes any one or more or each of the first through eight examples and further includes wherein the trapping of air underneath the decoupler results in a stiffness of the decoupler that is greater than the stiffness of the decoupler in fluid communication with atmosphere, but less than the stiffness of the decoupler when in a stationary position in contact with the partitioning structure. A tenth example of the method optionally includes any one or more or each of the first through ninth examples and further includes wherein the selective coupling of the vacuum chamber to either the first pressure or the second pressure is controlled by a two-way valve and wherein configuration of the two-way valve is controlled responsive to engine operating conditions. An eleventh example of the method optionally includes any one or more or each of the first through tenth examples and further includes wherein engine operating conditions include an idle mode and a ride mode, the idle mode comprising vehicle speeds less than or equal to a predetermined speed, and the ride mode comprising vehicle speeds greater than the predetermined speed; and wherein the second pressure is applied under idle mode operating conditions, and the first pressure is applied under the ride mode operating conditions.

An example of a hydraulic engine mount comprises a first elastomeric member received within an upper external housing, and a second elastomeric member received within a lower external housing; a partitioning structure coupled between the first elastomeric member and the second elastomeric member such that a first fluid chamber is formed with the first elastomeric member and a second fluid chamber is formed with the second elastomeric member, the first and second fluid chambers housing a hydraulic fluid; a first fluid passageway and a second fluid passageway through the partitioning structure to enable fluid flow between the first fluid chamber and the second fluid chamber, the first fluid passageway having a lower resistance to fluid flow than the second fluid passageway; a decoupler positioned on the partitioning structure and exposed to the first fluid chamber and configured to selectively assume a stationary position in contact with the partitioning structure or a secondary position not in contact with the partitioning structure; a vacuum chamber, coupled within the partitioning structure comprising a first passageway and a second passageway; a first vacuum actuated valve housed within the first passageway of the vacuum chamber; a second vacuum actuated valve housed within the second passageway of the vacuum chamber; a conduit coupled to the vacuum chamber, the conduit comprising a two-way valve configured to selectively couple the vacuum chamber to atmospheric pressure or vacuum; a first air passage and a second air passage housed within the partitioning structure and fluidly connected to the vacuum chamber, the first air passage fluidly connected to the vacuum chamber at a position below the second vacuum actuated valve near the second fluid chamber, and the second fresh air passage fluidly connected to the vacuum chamber at a position above the second vacuum actuated valve near the first fluid chamber; and a one way check valve coupling the first air passage and the second air passage within the partitioning structure.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   in a first condition, evacuating a vacuum chamber housed within a partitioning structure of a hydraulic engine mount to open a first fluid track that is positioned in parallel to an open, second fluid track and to maintain a decoupler seated against the partitioning structure, application of vacuum to the vacuum chamber opening the first fluid track via an opening of a first vacuum-actuated valve positioned in the first fluid track, and the application of vacuum seats the decoupler by coupling the vacuum to the decoupler via an opening of a second vacuum-actuated valve positioned in the vacuum chamber; and
   in a second condition, applying atmospheric pressure to the vacuum chamber to close the first fluid track while maintaining open the second fluid track to trap air passively underneath the decoupler via a one-way check valve positioned between a first air passage and a second air passage.

2. The method of claim 1, wherein the partitioning structure separates a first fluid chamber and a second fluid chamber, the first fluid chamber and the second fluid chamber each housing hydraulic fluid, and with the first fluid track and second fluid track enabling a flow of fluids between the first fluid chamber and the second fluid chamber.

3. The method of claim 1, wherein, in the second condition, the application of atmospheric pressure to the vacuum chamber closes the first fluid track via a closing of the first vacuum-actuated valve, and the application of atmospheric pressure passively traps air under the decoupler by closing the second vacuum-actuated valve and directing a flow of air through the first air passage to the second air passage via the one-way check valve, the second air passage in fluid communication with the decoupler and the closed second vacuum-actuated valve.

4. The method of claim 3, wherein the first air passage and the second air passage are housed within the partitioning structure, and wherein the first air passage is positioned below the second vacuum-actuated valve, and wherein the second air passage is positioned above the second vacuum-actuated valve.

5. The method of claim 1, wherein the first fluid track has a lower resistance to fluid flow than the second fluid track.

6. The method of claim 1, wherein the first condition comprises selectively applying vacuum to the vacuum chamber in response to conditions wherein vehicle speeds are less than or equal to a predetermined speed; and
 wherein the second condition comprises selectively applying atmospheric pressure to the vacuum chamber in response to conditions wherein vehicle speeds are greater than a predetermined speed.

\* \* \* \* \*